United States Patent [19]

Hirai et al.

[11] Patent Number: 5,379,137
[45] Date of Patent: Jan. 3, 1995

[54] LIQUID CRYSTAL DISPLAY ELEMENT AND A PROJECTION TYPE LIQUID CRYSTAL DISPLAY APPARATUS

[75] Inventors: Yoshinori Hirai; Satoshi Niiyama; Tomoki Gunjima, all of Yokohama, Japan

[73] Assignee: AG Technology Co., Ltd., Yokohama, Japan

[21] Appl. No.: 108,009

[22] Filed: Aug. 18, 1993

Related U.S. Application Data

[63] Continuation of Ser. No. 998,029, Dec. 29, 1992, abandoned, which is a continuation of Ser. No. 858,025, Mar. 26, 1992, Pat. No. 5,196,952.

[30] Foreign Application Priority Data

Mar. 27, 1991 [JP] Japan .................. 3-87541

[51] Int. Cl.⁶ .................. G02F 1/13; G02F 1/137
[52] U.S. Cl. .................. 359/51; 359/93; 359/102
[58] Field of Search .................. 359/51, 52, 93, 102

[56] References Cited

U.S. PATENT DOCUMENTS

| | | | |
|---|---|---|---|
| 4,506,550 | 3/1985 | Sandhu | 359/86 |
| 4,579,423 | 4/1986 | Fergason | 359/52 |
| 4,588,518 | 5/1986 | Nakagami et al. | 359/84 |
| 4,632,514 | 12/1986 | Ogawa et al. | 359/68 |
| 4,707,080 | 11/1987 | Fergason | 359/51 |
| 4,767,194 | 8/1988 | Heppke et al. | 359/48 |
| 4,890,902 | 1/1990 | Doane et al. | 359/53 |
| 5,103,327 | 4/1992 | Hirai et al. | 359/93 |
| 5,150,232 | 9/1992 | Gunjima et al. | 359/81 |
| 5,196,952 | 3/1993 | Hirai et al. | 359/93 |
| 5,216,531 | 6/1993 | Hirai et al. | 359/93 |
| 5,233,445 | 8/1993 | Kamath et al. | 359/51 |
| 5,235,445 | 8/1993 | Hirai et al. | 359/52 |
| 5,304,323 | 4/1994 | Arai et al. | 359/51 |

FOREIGN PATENT DOCUMENTS

| | | |
|---|---|---|
| 0313053A2 | 4/1989 | European Pat. Off. |
| 0362776 | 4/1990 | European Pat. Off. |
| 0409442A2 | 1/1991 | European Pat. Off. |
| 4005869A1 | 9/1990 | Germany |
| 2-278230 | 11/1990 | Japan |
| WO91-05029 | 4/1991 | WIPO |
| WO91/15555 | 10/1991 | WIPO |

OTHER PUBLICATIONS

Derwent Abstract of WO91-5029 (Apr., 1991).
Drzaic, "Droplet shape and reorientation fields in nematic droplet/polymer films", Liquid Crystals, vol. 5, No. 5 (1989), pp. 1467–1475.
Drzaic, "Thermodynamics of the electric field induced orientation of nematic droplet/polymer films," SPIE, vol. 1080, Liquid crystal chemistry, Physics, and Applications (1989), pp. 11–17.
Smith et al, "The relationship between formation kinetics and microdroplet size of epoxy based polymer dispersed liquid crystals", Liquid Crystals, vol. 3, No. 5 (1988), pp. 543–571.

(List continued on next page.)

Primary Examiner—Anita Pellman Gross
Attorney, Agent, or Firm—Oblon, Spivak, McClelland, Maier & Neustadt

[57] ABSTRACT

A liquid crystal display element comprises a pair of substrates provided with electrodes and a liquid crystal and solidified matrix composite material, disposed between the pair of substrates, which includes a nematic liquid crystal dispersed and held in a solidified matrix, the nematic liquid crystal being such that the refractive index of the liquid crystal is changed depending on states of applying a voltage wherein in a state, the refractive index of the liquid crystal substantially coincides with that of the solidified matrix to thereby pass light, and in the other state, the former does not coincide with the latter to thereby cause the scattering of light, wherein the refractive index anisotropy $\Delta n$ of the liquid crystal used is 0.18 or higher, and the dielectric anisotropy $\Delta\epsilon_{LC}$ of the liquid crystal used satisfies the relation of $5 < \Delta\epsilon_{LC} < 13$.

27 Claims, 2 Drawing Sheets

OTHER PUBLICATIONS

Drzaic, "Reorientation dynamics of polymer dispersed nematic liquid crystal films," Liquid Crystals, vol. 3, No. 11 (1988), pp. 1543–1559.

Margerun et al, "Addressing factors for polymer dispersed liquid crystal displays", SPIE, vol. 1455, Liquid Crystal Devices and Materials (1991), pp. 27–38.

Rieger et al, "New highly stable liquid crystal mixtures for use in TFT-TN displays", Proceedings of the 5th Liquid Crystal Seminar, Organized by Merck Japan Limited (Jul. 1991), pp. 81–95.

Finkenzeller et al, "Material parameters and their impact on the performance of PDLC devices," Proceedings of the 5th Liquid Crystal Seminar, Organized by Merck Japan Limited (Jul. 1991), pp. 96–112.

Rieger et al, "Stability studies on new liquid crystal mixtures for active matrix applications," Proceedings of the 4th Liquid Crystal Seminar, Organized by Merck Japan Limited (Jun. 1990), pp. 5–33.

B. Wu et al, "Angular discrimination of light transmission through polymer–dispersed liquid–crystal films", J. Appl. Phys. vol. 62, No. 9, pp. 3925–3931 (Nov. 1987).

Derwent Abstract of DE 4,005,869 (Sep., 1990).

Fuh et al, "Polymer dispersed nematic liquid crystal films: The density ratio and polymer's curing rate effects", Journal of Applied Physics, vol. 66, No. 11 (Dec., 1989), pp. 5278–5284.

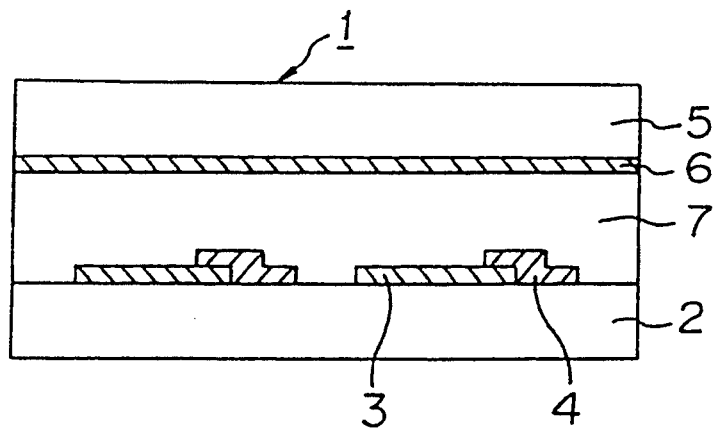
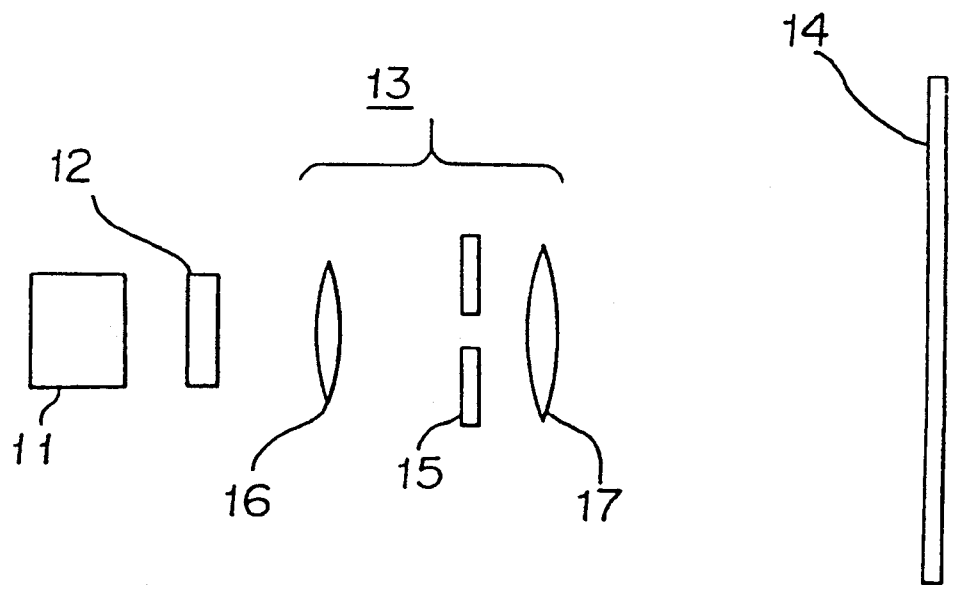

LIQUID CRYSTAL DISPLAY ELEMENT AND A PROJECTION TYPE LIQUID CRYSTAL DISPLAY APPARATUS

This application is a continuation of application Ser. No. 07/998,029, filed on Dec. 29, 1992, now abandoned, which was a continuation of Ser. No. 07/858,025, filed on Mar. 26, 1992, now U.S. Pat. No. 5,196,952.

The present invention relates to a liquid crystal display element including a nematic liquid crystal dispersed and held in a solidified matrix, especially, a liquid crystal display element having an active element for each picture element electrode and a projection type liquid crystal display apparatus using such display element.

In recent years, liquid crystal displays have been widely used for personal word processors, hand-held computers, portable TV sets and so on, taking the advantages of low power consumption, low driving voltage and so on. Of the liquid crystal displays, liquid crystal display elements having an active element for each picture element electrode have particularly been noted and developed.

As such liquid crystal display elements, there was a proposal on liquid crystal display elements in which a dynamic scattering mode (DSM) liquid crystal is used. However, the liquid crystal display element of this type had a disadvantage of large current consumption because a high value of electric current passed in the DSM liquid crystal. Now, liquid crystal display elements in which a twist nematic (TN) type liquid crystal is used have been widely used. For instance, portable TVs have been widely commercialized. Since the TN type liquid crystal display element has a very small leak current and a small power consumption, it is suitable for using a battery as a power source.

When the liquid crystal display element using active elements is used for DS mode, the leak current of the liquid crystal itself is large. Accordingly, it was necessary to provide a large storage capacitance in parallel to each picture element, and the power consumption of the liquid crystal display element itself is large.

In the TN mode, since a leak current in the liquid crystal itself is very small, it is unnecessary to provide a large storage capacitance and the power consumption of the liquid crystal display element itself can be small.

In the TN mode liquid crystal, however, there is problem that the transmittance of light is small because two polarization plates are required. In particular, when a color filter is used for obtaining a colored display, only several percents of incident light can be utilized. It is, therefore, necessary to use a strong light source, as a result of increasing power consumption.

Further, the TN mode liquid crystal display element has disadvantages of requiring a very strong light source for projecting a picture image on a projection screen, difficulty in obtaining a high contrast on the projection screen, and adverse effect to the liquid crystal display element due to heat from the light source.

In order to solve the problems in the TN mode liquid crystal display element, there is proposed such mode that a liquid crystal polymer composite material in which a nematic liquid crystal is dispersed and held in a polymer matrix is used, and a low voltage such as 10 V or lower is sufficient to drive it by utilizing the scattering-transparent characteristics.

However, in the conventional liquid crystal and polymer composite material, there was hysteresis in the voltage-transmittance characteristics, that is, there was a problem that the transmittance during the increase of voltage is different from that during the decrease of voltage. Accordingly, there was a problem of a phenomenon of image-sticking wherein a picture image which had appeared in the display just before the changing of picture remained in the present display for several minutes.

The present invention is to provide a liquid crystal display element having a high brightness and a high contrast ratio, capable of providing a clear gray scale display and reducing an image-sticking phenomenon due to the hysteresis of the liquid crystal and solidified matrix composite material.

In accordance with the present invention, there is provided a liquid crystal display element comprising a pair of substrates provided with electrodes and a liquid crystal and solidified matrix composite material, disposed between the pair of substrate, which includes a nematic liquid crystal dispersed and held in a solidified matrix, the nematic liquid crystal being such that the refractive index of the liquid crystal is changed depending on states of applying a voltage wherein in a state, the refractive index of the liquid crystal substantially coincides with that of the solidified matrix to thereby pass light, and in the other state, the former does not coincide with the latter to thereby cause the scattering of light, characterized in that the refractive index anisotropy $\Delta n$ of the liquid crystal used is 0.18 or higher, and the dielectric anisotropy $\Delta \epsilon_{LC}$ of the liquid crystal used satisfies the relation of $5 < \Delta \epsilon_{LC} < 13$.

In accordance with the present invention, there is provided a projection type liquid crystal display apparatus comprising in combination a projection light source, a projection optical system and a liquid crystal display element comprising an active matrix substrate having an active element for each electrode for picture element, a counter electrode substrate provided with a counter electrode and a liquid crystal and solidified matrix composite material, interposed between the active matrix substrate and the counter electrode, which includes a nematic liquid crystal dispersed and held in a solidified matrix, the nematic liquid crystal being such that the refractive index of the liquid crystal is changed depending on states of applying a voltage wherein in a state, the refractive index of the liquid crystal substantially coincides with that of the solidified matrix to thereby pass light, and in the other state, the former does not coincide with the latter to thereby cause the scattering of light, characterized in that the refractive index anisotropy $\Delta n$ of the liquid crystal used for the liquid crystal and solidified matrix composite material is 0.18 or higher, and the dielectric anisotropy $\Delta \epsilon_{LC}$ of the liquid crystal used satisfies the relation of $5 < \Delta \epsilon_{LC} < 13$.

In accordance with the present invention having the above-mentioned construction, there is obtainable a liquid crystal display element which reduces an image-sticking phenomenon due to the hysteresis, has a high contrast ratio and can be driven at a low voltage.

In the present invention, a liquid crystal and solidified matrix composite material in which a nematic liquid crystal is dispersed and held in a solidified matrix is used. It is particularly preferable to use a liquid crystal and solidified matrix composite material in which a nematic liquid crystal having a positive dielectric anisotropy is dispersed and held in a solidified matrix, and the refractive index of the solidified matrix substantially coincides with that of the ordinary refractive index ($n_o$) of the liquid crystal used. The liquid crystal and solidified matrix composite material is interposed between a pair of substrates with electrodes, preferably, between an active matrix substrate having an active element for each electrode for picture element and a counter electrode substrate with a counter electrode.

The substrates with electrodes may be such one made of glass, plastics, ceramics or the like on which electrodes are formed.

The active matrix substrate is such one made of glass, plastics, ceramics or the like on which electrodes and active elements such as thin film transistors, (TFTs), thin film diodes, metal-insulation-metal-non-linear resister device or the like are formed. A single or a plurality of active elements are connected to each of the picture element electrodes.

The counter electrode is such one made of glass, plastics, ceramics or the like on which electrodes are formed. The counter electrode is combined with the active matrix substrate so as to be capable of providing a display.

The liquid crystal and solidified matrix composite material is interposed between the above-mentioned substrates with electrodes. The liquid crystal and solidified matrix composite material is such one that the refractive index of liquid crystal in the liquid crystal and solidified matrix composite material is changed depending on a state of applying a voltage. When the refractive index of the solidified matrix substantially agrees with the refractive index of the liquid crystal, light is transmitted, and when the former does not agree with the latter, the light is scattered. Since no polarization plates are used, a bright display can be easily obtained.

The liquid crystal display element of the present invention can be used not only as a direct view type display element but also a projection type display element. When the liquid crystal display element of the present invention is used as the direct view type display element, a display apparatus may be constituted in combination with a backlight, a lens, a prism, a mirror, a diffusion plate, a light absorbing material, a color filter and so on in accordance with the display characteristics which are desired to obtain.

Further, the liquid crystal display element can be used for a shutter for laser beams or a reflection type display element.

The liquid crystal display element of the present invention is, in particular, suitable for a projection type display apparatus, and the projection type liquid crystal display apparatus can be constituted by combining the liquid crystal display element with a projection light source, a projection optical system and so on.

A conventional projection light source and a conventional projection optical system such as a lens may be used for the light source and the projection optical system. Generally, the liquid crystal display element is arranged between a projection light source and the projection lens.

In the liquid crystal display element of the present invention, a transparent-scattering type liquid crystal and solidified matrix composite material is interposed between the two substrates with electrodes, in particular, between the active matrix substrate and the counter electrode substrate. Specifically, according to the present invention, the liquid crystal display element comprising a liquid crystal and solidified matrix composite material in which a nematic liquid crystal is filled in a large number of fine holes formed in the solidified matrix, is used. The liquid crystal and solidified matrix composite material is put between the active matrix substrate and the counter electrode substrate. When a voltage is applied across the electrodes of the liquid crystal display element, the refractive index of the liquid crystal is changed, and the relation between the refractive index of the solidified matrix and the refractive index of the liquid crystal is changed. Namely, such a liquid crystal display element that when the refractive indices of the both members are in agreement with each other, a state of transmission is provided, and when not, a state of scattering is provided, can be used.

The liquid crystal and solidified matrix composite material comprising the solidified matrix having a large number of fine holes and the liquid crystal filled in the fine holes has such a structure that the liquid crystal is sealed in vacuoles such as microcapsules wherein the individual microcapsules may not be completely independent or the individual vacuoles may be communicated with each other through fine gaps like a porous material.

The liquid crystal and solidified matrix composite material used for the liquid crystal display element according to the present invention can be prepared as follows. A nematic liquid crystal and a curable compound for forming the solidified matrix are mixed to obtain a solution or a latex. Then, the solution or latex is cured by the application of light or heat, or by removing solvent or by subjection it to reactive curing thereby separate the solidified matrix and to disperse the liquid crystal in the solidified matrix.

Use of the photo-curable or heat-curable type compound is preferred since it can be cured in an enclosed system.

In particular, use of a photo-curable type compound is preferred since it can be cured in a short period of time with little influence of heat.

As a specific production method, the cell may be formed by using a sealing material, an uncured mixture of the nematic liquid crystal and the curable compound is injected from the injection port in the same manner as in the conventional nematic liquid crystal display element, and after sealing the injection port, they can be cured by light irradiation or heating.

The liquid crystal display element according to the present invention may also be prepared without using a sealing material, for example, by supplying an uncured mixture of the nematic liquid crystal and the curable compound on a substrate provided with a transparent electrode as a counter electrode, overlaying, on that substrate, an active matrix substrate having an active element for each picture element electrode and then curing the material by means of light-irradiation or the like.

The periphery of the display element assembly may be sealed by coating the sealing material. According to this production method, since it is only required to supply the uncured mixture of the nematic liquid crystal and the curable compound by means of coating such as roll coating, spin coating, printing or by the method of using a dispenser or the like, the injection step is simple and the productivity is extremely high.

Further, the uncured mixture of the nematic liquid crystal and the curable compound may be incorporated with spacers for controlling the inter-substrate gap such as ceramic particles, plastic particles or glass fibers, pigments, dyes, viscosity controllers or any other additives which does not adversely influence to the performance of the liquid crystal display element of the present invention.

During the curing step of the liquid crystal display element which shows a transparent state when a voltage is applied, if the element is cured under the condition that a sufficiently high voltage is applied to only a specified portion, it is possible to render that portion to be a state of normally light transmittance. Accordingly, when a fixed display is desired, such normally light transmittance portion may be formed.

On the contrary, in a case of using the display element which shows a scattering state when a voltage is applied, a normally scattering portion can be formed in the same manner as the above.

In the liquid crystal display element using the liquid crystal and solidified matrix composite material, higher transmittance in the light transmission state is preferable and the haze value in the light scattering state is preferably not less than 80%.

In the present invention, it is preferable that the refractive index of the solidified matrix (after curing) agrees with the ordinary refractive index ($n_0$) of the liquid crystal used, in a state of applying voltage.

Thus, light is transmitted when the refractive index of the solidified matrix agrees with the refractive index of the liquid crystal, while the light is scattered (opaque) when they do not agree with each other. The scattering property of the element is higher than that of the liquid crystal display element in the conventional DS mode and a display having a high contrast ratio can be obtained.

The major object of the present invention is to provide a liquid crystal display element capable of being driven at a low voltage while an image-sticking phenomenon due to the hysteresis of a liquid crystal and solidified matrix composite material is minimized. The liquid crystal display element can provide a high performance such as a high density display in combination with active elements. The liquid crystal display element of the present invention also has excellent performance in another usage (an optical shutter, a display, a spatial light modulator and so on) which requires a half-tone display.

In the conventional liquid crystal and solidified matrix composite material, there appeared hysteresis in the voltage-transmittance characteristics, this causing a trouble in gray-scale displaying. The hysteresis is a phenomenon that transmittance is different between a course of increasing the voltage and a course of decreasing the voltage. If the hysteresis exists, an information which has appeared in a picture image remains in gray-scale displaying. Namely, the image-sticking is apt to occur to thereby deteriorate the quality of picture image.

As one of the causes which produce the hysteresis in the liquid crystal and solidified matrix composite material, there is a structure in the composite material wherein the liquid crystal is dispersed and held in the solidified matrix. Namely, it is considered that there is the hysteresis by the interaction of the liquid crystal existing in the solidified matrix in a separate form. The magnitude of the hysteresis is determined by an elastic energy stored in the liquid crystal held in the solidified matrix, an electric energy caused by an electric field applied from the outside and energy by the interaction of the liquid crystal existing in a separate form in the solidified matrix. Accordingly, the hysteresis can be reduced by optimizing balance of the energies, and an excellent display in which there is no image-sticking can be obtained even in a gray-scale display.

It is an object of the present invention to provide a liquid crystal display element having a high contrast ratio, high brightness and excellent response and capable of reducing hysteresis. Further, the object of the present invention is to obtain a liquid crystal display element which can be driven with use of a conventional TN active element and a conventional driving circuit.

It is in particular important that the dielectric constant and the dielectric anisotropy $\Delta\epsilon_{LC}$ of the liquid crystal and the dielectric constant $\epsilon_p$ of the solidified matrix are balanced in order to reduce the hysteresis resulted from the fact that the liquid crystal particles are dispersed in the solidified matrix. This is because these factors primarily determine interaction of the liquid crystal particles dispersed in the solidified matrix. It is preferable that the dielectric anisotropy $\Delta\epsilon_{LC}$ of the liquid crystal used satisfies the following relation in order to reduce the hysteresis:

$$5 < \Delta\epsilon_{LC} < 13 \quad (1)$$

The value $\Delta\epsilon_{LC}$ is a quantity related to both the hysteresis and a driving voltage wherein the upper limit of the quantity is determined by the magnitude of the hysteresis and the lower limit is determined by the driving voltage. The above-mentioned condition is apparently disadvantageous from common knowledge on the conventional TN type liquid crystal display element that the larger the value $\Delta\epsilon_{LC}$ is the lower the driving voltage is. However, such view on the conventional TN type liquid crystal display element wherein the driving voltage is in inverse proportion to the square root of $\Delta\epsilon_{LC}$ is not established in a system in which the liquid crystal particles are dispersed, because a distribution of voltage in a liquid crystal portion and a matrix portion varies depending on arrangement of the liquid crystal. In the liquid crystal and solidified matrix composite material of the present invention, $\Delta\epsilon_{LC}$ does not much influence to the driving voltage. If $\Delta\epsilon_{LC}$ is determined to be larger than 5, the driving voltage does not become extremely high by reducing $\Delta\epsilon_{LC}$. When a liquid crystal in which $\Delta\epsilon_{LC}$ is extremely large is used, there is a problem that temperature dependence of the elastic constant directly causes temperature dependence of the voltage-transmittance characteristics. Accordingly, the value $\Delta\epsilon_{LC}$ should have the above-mentioned range. The range of $\Delta\epsilon_{LC}$ will be discussed in more detail with respect to explanation on the elastic constant.

It is preferable that the dielectric constant $\epsilon_M$ of the liquid crystal and solidified matrix composite material at a sufficiently low voltage which is lower than the threshold voltage, and the dielectric anisotropy $\Delta\epsilon_{LC}$ of the liquid crystal used have the relation:

$$\Delta\epsilon_{LC} < 1.45\epsilon_M \quad (2)$$

in order to reduce the hysteresis.

When $\Delta\epsilon_{LC}$ exceeds that range, movement of the liquid crystal in a single liquid crystal particle causes a large change of dielectric constant in that particle. As a result, a large change of electric field is created around the particle, whereby an electrical interaction between liquid crystal particles, which is the major factor to cause the hysteresis, becomes large. The $\epsilon_M$ is a quantity related to the dielectric constant $\epsilon_P$ of the solidified matrix. When the dielectric constant $\epsilon_P$ of the solidified matrix increases, the dielectric constant $\epsilon_M$ of the liquid crystal and solidified matrix composite material will increase, whereby the available range of $\Delta\epsilon_{LC}$ will expand.

The value of the refractive index anisotropy $\Delta n$ of the liquid crystal used should be 0.18 or larger in order to increase the scattering property without applying an electric field to thereby obtain a high scattering property. Specifically, it is preferable to be $\Delta n \geq 0.20$. Further, the ordinary refractive index $n_0$ of the liquid crystal used preferably substantially agrees with the refractive index $n_P$ of the solidified matrix. In this case, a high transmittance property can be obtained when an electric field is applied. Specifically, it is preferable to satisfy the relation of $n_0 - 0.03 < n_p < n_0 + 0.05$.

Although the hysteresis in the liquid crystal and solidified matrix composite material is caused mainly by the above-mentioned factors, an electro-optical hysteresis as an optical element or a display element is not determined solely by the above-mentioned elastic energy, electrical energy and interaction energy. Namely, the optical hysteresis depends also on how the hysteresis is optically influenced by the arrangement of the liquid crystal. For instance, even though there is a region of the hysteresis by the arrangement of the liquid crystal, there is no electro-optical hysteresis as long as the region does not optically influence at all.

The major factor to connect the arrangement of the liquid crystal to the optical characteristics is the refractive index anisotropy $\Delta n$ of the liquid crystal because the magnitude of $\Delta n$ determines the relation between a change of the arrangement of the liquid crystal and a change of optical properties. When $\Delta n$ is large, a change of the refractive index of a portion becomes large in a case that the arrangement of the liquid crystal is changed by an outer field such as an electric field, whereby the change of the arrangement of the liquid crystal largely influences optical properties. When $\Delta n$ is small, there is no large optical change as far as the arrangement of the liquid crystal does not largely changed. Accordingly, as $\Delta n$ large, the hysteresis by the arrangement of the liquid crystal creates a large electro-optical hysteresis. In other words, the amplification factor from the voltage dependency of the arrangement of the liquid crystal to the optical characteristics becomes large as $\Delta n$ is large.

In view of the above, it is desirable that $\Delta n$ is smaller than a certain level in order to reduce the electro-optical hysteresis. Specifically, it is desirable to satisfy the relation of $\Delta n \leq 0.25$, more preferably, $\Delta n \leq 0.24$.

Further, the driving voltage is primary determined by the diameter of the liquid crystal particles and a distribution of the particles. Regarding to the diameter of the liquid crystal particles, it is preferable that the diameter of the liquid crystal particles in average (average particle diameter) R of the liquid crystal and solidified matrix composite material is in a range of:

$$0.2 < \Delta n \cdot R < 0.7 \quad (3)$$

A value within that range is required because the scattering property becomes large at the time of applying no electric field and the liquid crystal is driven at a low electric field in a case of using a display element wherein the refractive index of the liquid crystal agrees with the refractive index of the solidified matrix at the time of application of an electric field.

$\Delta n$ is closely related to the temperature dependence of the electro-optical characteristics of the liquid crystal and solidified matrix composite material. When $\Delta n$ greater than or equal to 0.18, the optimum diameter of the liquid crystal particles as defined in the equation (3) exists, whereby an element having high scattering property or transmitting property is obtained at an OFF time. However, the temperature dependence largely varies depending on the value $\Delta n$. The scattering property per a single liquid crystal particle at an OFF time is the function of $X = \Delta n \cdot R / \lambda$ ($\lambda$: wavelength). The scattering property initially increases as the value X increases. However, it assumes gradually a constant value, and thereafter, the scattering property decreases. Accordingly, if an element is constituted under conditions that the scattering property or the transmitting property becomes constant, it is possible to obtain such an element that the scattering property or the transmitting property at the OFF time is not substantially changed regardless of a change of $\Delta n$. In this case, there is an advantage that the scattering property is not easily changed in response to a change of wavelength, whereby an element wherein the scattering property or the transmitting property at an OFF time is less influenced by wavelength. Accordingly, it is easy to obtain a balance in colors in a color display. Specifically, the value $\Delta n$ to satisfy the above-mentioned conditions is in a range of $0.18 \leq \Delta n \leq 0.25$. An element having a value $\Delta n$ in the above-mentioned range and a value R defined in the equation (3) can remarkably reduce a change of the scattering property or the transmitting property due to a change of temperature at an OFF time. For instance, in the element having $\Delta n = 0.21$ and $R = 2.4 \mu m$, there is no substantial change in the scattering property or the transmitting property at an OFF time in a temperature range near the room temperature (for instance, in a range of 0°–60° C.).

Since the liquid crystal and solidified matrix composite material, when it is driven in a 2-state display without gray scale, is driven between an OFF state and a sufficiently high (saturated voltage or higher) ON state, it shows a response at several tens msec or lower, and accordingly, it is generally suitable for a high speed display. However, when a gray scale display is carried out, a voltage lower than the saturated voltage can be used in order to display a half tone. Accordingly, the response becomes sometimes slower than that at the 2-state display driving mode. The responding property at the gray scale displaying time shows a tendency of a slower responding property as the display is conducted at a low voltage side (i.e. a dark display). In particular, when the display is changed from an OFF state to a low transmitting state, the responding property is the slowest, and the responding property is sometimes several tens times or more as slow as the responding property at the static 2-state display driving time.

In order to reduce a residual image in the gray scale display, it is preferable that the refractive index anisotropy $\Delta n$ and the viscosity $\eta$ (cSt) of the liquid crystal dispersed and held in the solidified matrix are in a relation:

$$\Delta n^2 / \eta > 0.001 \quad (4)$$

In particular, it is preferable that they satisfy the following equation in order to provide good responding property at the OFF time of voltage:

$$\Delta n^2/\eta > 0.0014 \qquad (4A)$$

Further, it is preferable to satisfy the following relation:

$$5(K33/\eta)^{0.5} > R > (K33/\Delta\epsilon_{LC})^{0.5} \qquad (5)$$

In particular, it is preferable to satisfy the following relation:

$$4(K33/\eta)^{0.5} > R > (K33/\Delta\epsilon_{LC})^{0.5} \qquad (5A)$$

In the above-mentioned ranges, a torque acting on the liquid crystal at each voltage in the gray scale display is balanced whereby the display with few residual image can be obtained, and the electric field needed to drive the liquid crystal can be suppressed to be low. The above-mentioned physical values of the liquid crystal are values in terms of room temperature.

The above-mentioned relations are applicable to a case that the shape of the liquid crystal particles is substantially spherical. In the present invention, however, the effect of reducing the hysteresis can be improved by deforming the shape of the liquid crystal particles into a shape other than a spherical shape. In this case, a shape having complicated projections and recesses is not preferable because an extremely high driving electric field is needed although the responding property is excellent. Accordingly, it is preferable that the shape of the liquid crystal particles is a ellipsoidal form. Further, in this case, when the long axis of the ellipsoidal liquid crystal particles is arranged in a specified direction, the above-mentioned effect can not be obtained. Therefore, the long axis of the liquid crystal particles should be arranged in random with respect to the normal line to the electrode surface, namely, the long axis of the liquid crystal particles should be arranged in a two-dimensional manner, preferably in a three-dimensional manner.

Regarding to the above-mentioned relations, the average particle diameter R of the liquid crystal is closely related to the scattering property, the responding property, operating electric field and so on. When R becomes large, an electric field necessary for driving becomes small and the responding property becomes slow. When R becomes small, an elastic energy accumulated per unit quantity of liquid crystal becomes large and the responding speed becomes fast. However, a high electric field is needed to drive the display element.

The viscosity $\eta$ and the dielectric anisotropy $\Delta\epsilon_{LC}$ anisotropy of the liquid crystal are also factors deeply related to the response property. As the viscosity is small or the dielectric anisotropy is large, the response speed becomes faster. Further, $\Delta\epsilon_{LC}$ is also related to an electric field necessary to drive the liquid crystal. As $\Delta\epsilon_{LC}$ is large, a necessary electric field becomes smaller.

The elastic constant of the liquid crystal determines an elastic energy to be accumulated in the liquid crystal. A bend energy derived from the elastic constant K33 particularly greatly functions in the liquid crystal and solidified matrix composite material, and the bend energy deeply concerns with the response characteristics and the driving characteristics, i.e. the elastic torque acting on the liquid crystal. Although it is advantageous that the elastic constant K33 is large in order to reduce the hysteresis, an excessively large K33 will increase a driving electric field. Accordingly, the value K33 can be selected in consideration of a balance on the other physical properties of the liquid crystal (such as $\Delta n$, $\Delta\epsilon_{LC}$, $\eta$ and so on). Further, since the voltage-transmittance characteristics of the liquid crystal has temperature dependence, it is necessary to optimizes the dielectric anisotropy $\Delta\epsilon_{LC}$ and the elastic constants K11, K33 of the liquid crystal, which are physical quantities changeable depending on temperature, in addition to the before-mentioned relation between $\Delta n$ and R.

Since the liquid crystal is dispersed and held in the solidified matrix in the liquid crystal and solidified matrix composite material, it is not always that the entire voltage is applied to the liquid crystal, but the voltage is shared between a liquid crystal portion and a matrix portion. Generally, when $\Delta\epsilon_{LC}$ of the liquid crystal is larger, the larger dielectric constant $\epsilon//$ of the liquid crystal is larger, whereby the voltage shared by the matrix increases at the application of voltage and the voltage shared by the liquid crystal portion decreases. Accordingly, there is no substantial effect to reduce the driving voltage in a region having a large value of $\Delta\epsilon_{LC}$ even though the value $\Delta\epsilon_{LC}$ is made large. From this reason, when the value $\Delta\epsilon_{LC}$ is large, the elastic constant mainly determines the voltage-transmittance characteristics. Accordingly, when the liquid crystal having a larger $\Delta\epsilon_{LC}$ is used, the temperature dependence of the elastic constant has direct connection to the temperature dependence of the voltage-transmittance characteristics. On the other hand, as the $\Delta\epsilon_{LC}$ is made small, the voltage shared by the liquid crystal portion increases, and the voltage-transmittance characteristics are determined by the proportion of $\Delta\epsilon_{LC}$ and the elastic constant. The value $\Delta\epsilon_{LC}$ and the elastic constant are both physical quantities which decrease with a temperature rise. Accordingly, by selecting the physical quantities suitably to thereby cancel respective changes of temperature, a liquid crystal and solidified matrix composite material having voltage-transmittance characteristics which are substantially free from temperature dependence or has a little temperature dependence can be obtained.

In view of the above, it is preferable that the dielectric anisotropy $\Delta\epsilon_{LC}$ of the liquid crystal is in a range of $\Delta\epsilon_{LC} < 13$ and the elastic constant K (K=(K11+K33)/2) ($10^{-12}$N) satisfies the condition of $1 < K/\Delta\epsilon_{LC}$. When $K/\Delta\epsilon_{LC}$ is too large, the driving voltage increases. Accordingly, it is preferable that $K/\Delta\epsilon_{LC} < 3$.

The clearing point Tc (the transition temperature from liquid crystal to an isotropic liquid) is also important for the temperature dependence. The above-mentioned function can not be expected unless Tc is higher to a certain extent than an operating temperature range because the change of the physical quantities is very abrupt at a temperature near the transition point. Accordingly, the clearing point Tc of the liquid crystal used should not be lower than either higher temperature of "the center temperature of the operating temperature range +30° C." or "the upper operating temperature +10° C.". In a case of the temperature range of 0° C.–60° C. as described above, Tc should not be lower than 70° C.

It is preferable that the liquid crystal dispersed and held in the solidified matrix is formed of liquid crystal particles which are independent from each other or partially connected liquid crystal particles. The liquid crystal of this kinds effectively function to provide a high scattering property and a high transmittance at a low driving voltage. A scattering phenomenon is resulted at the interface between the liquid crystal and a matrix material. A greater surface area of the interface improves the scattering property.

When the surface area of the interface is to be increased with a certain average particle diameter of the liquid crystal particles, it is important that an amount of the liquid crystal is increased independent of the solidified matrix, namely, the density of the liquid crystal particles is made large. However, when an amount of the liquid crystal is made large separate from the solidified matrix, some liquid crystal particles will be connected, and finally, all liquid crystal particles are connected to each other. Such structure of the liquid crystal will reduce the scattering property because the interface between the liquid crystal and the solidified matrix which are separated from each other, disappears.

Further, it is important for lowering the driving voltage that liquid crystal separately held in the solidified matrix has the substantially an equal driving electric field. For this purpose, a clear interface should be formed between the liquid crystal and the solidified matrix. The loss of the interface scatters the driving electric field, whereby reduction of the contrast ratio and increase in the driving voltage are apt to occur. It is, therefore, preferable that the liquid crystal dispersed and held in the solidified matrix is constituted by independent particles or partially connected particles in a high density state.

It is preferable that the particle diameter of the liquid crystal is uniform. If there is a distribution in the particle diameter, larger liquid crystal particles reduce the scattering property and smaller liquid crystal particles raises electric field for driving, with the result of inviting the raise of driving voltage and the reduction of contrast. The dispersion $\sigma$ of the particle diameter is preferably not less than 0.25 times as the average particle diameter, more preferably, not less than 0.15 times. The above-mentioned average particle diameter and dispersion are respectively volume-weighed values.

Liquid crystal to be used should be selected in consideration of the dielectric anisotropy $\Delta\epsilon_{LC}$ shown in the equations (1) and (2) and the relation between the refractive index anisotropy and the average particle diameter as shown in the equation (3). Specifically, $\Delta n$ should be 0.18 or higher.

In a case of using an element which shows a transparent state at the time of applying an electric field, when the electrode substrate gap d is increased, the scattering property at the time of applying no electric field is improved. However, the value d is excessively large, a high voltage is required to achieve a sufficient transparent property at the time of applying an electric field, this resulting problems of an increase of electric power and unabling to use conventional TN active elements and driving ICs. On the contrary, when the value d is made small, the scattering property at the time of applying no electric field decreases although high transparency is obtainable at a low voltage.

Therefore, in order to satisfy both the scattering property at the time of applying no electric field and the high transparency at the time of applying an electric field, it is preferable that the electrode substrate gap d ($\mu$m) satisfies:

$$3R < d < 9R \quad (6)$$

and further, the maximum effective voltage (V) applied to the liquid crystal and solidified matrix composite material satisfies:

$$0.6R \cdot V < d < 1.6R \cdot V \quad (7)$$

As far as these values are in the above-mentioned ranges, the conventional active element and the conventional driving IC for TN can be used to obtain a display having a high contrast ratio.

When the above-mentioned element is applied to a reflection type display apparatus, the scattering property at the time of scattering increases because light passes twice in the liquid crystal and solidified matrix composite material. Accordingly, it is possible to decrease the value d within the range of the equation (6), and also, the maximum driving voltage determined by the equation (7) can be reduced.

In the above explanation, use of a single liquid crystal display element has been explained. However, when three liquid crystal display elements are used for a projection type liquid crystal display apparatus wherein three kinds of light (R, G and B) are caused to pass through each liquid crystal display element, the above-mentioned equations have to be satisfied for each color. Further, the characteristics of the liquid crystal element should be adjusted for each color. Specifically, it is preferable that the relation of $\Delta n$, R and d of the liquid crystal display element to the center wavelength $\lambda$ of light used is adjusted to simultaneously satisfy the equations (8) and (9) mentioned below, or the values in the following equation (10) are substantially uniform in each color. When such equations are satisfied, the transparent-scattering property having uniform colors of light can be obtained.

$$\Delta n_i R_i / \lambda_i \approx \Delta n_j R_j / \lambda_j \quad (8)$$

$$d_i / R_i \approx d_j / R_j \quad (9)$$

$$\Delta n_i d_i^2 / \lambda_i \approx \Delta n_j d_j^2 / \lambda_j \quad (10)$$

wherein i and j represent colors.

In order to improve the scattering property when no electric field is applied, it is effective to increase the volume fraction $\Phi$ of the the liquid crystal which is operable in the liquid crystal and solidified matrix composite material. The range of $\Phi > 20\%$ is preferred. In order to obtain higher scattering property, it is preferable to be $\Phi > 35\%$, more preferably $\Phi > 45\%$. On the other hand, when the value $\Phi$ is excessively high, the stability in structure of the liquid crystal and solidified matrix composite material becomes inferior. Accordingly, it is preferable that $\Phi < 70\%$.

In the liquid crystal display element of the present invention wherein the ordinary refractive index ($n_0$) of the liquid crystal coincides with the refractive index of the solidified matrix, a scattering state (i.e., an opaque state) is shown due to a difference in refractive index between the liquid crystal not in an oriented condition to normal direction of a substrate and the solidified matrix when no electric field is applied. Accordingly, light is scattered by a portion of the liquid crystal display element at which no electrode is located. When said liquid crystal element is used for a projection type display apparatus, the portion other than picture elements looks dark because light does not reach a projection screen without light shielding layer at said portion. In order to prevent light from leaking from any other portion of the liquid crystal display element than the picture element electrodes, it is unnecessary to provide a light shielding layer for the portion other than the picture element electrodes. Accordingly, there is an advantage that the step of forming the light shielding layer is unnecessary.

An electric field is applied to a desired picture element. At the picture element portion to which the electric field is applied, the liquid crystal is oriented to the direction of field, so that the ordinary refractive index ($n_o$) of the liquid crystal and the refractive index (np) of the solidified matrix coincide with each other. Accordingly, the liquid crystal display element presents a transparent state, and light is transmitted through desired picture elements to thereby provide a bright display on a projection screen.

If the curable compound is cured during the curing step while a sufficiently high voltage is applied only to a specified portion of the element, the portion is formed to have a normally light transparent state. Accordingly, in a case that there is to form a fixedly display portion, such a normally transparent portion may be formed.

In the liquid crystal display element of the present invention, a colored display can be attained by providing a color filter. Color filters having different three colors may be provided in a single liquid crystal display element, or a color filter for a specified color may be provided in a single liquid crystal display element and three liquid crystal display elements having different color filters may be used in combination. The color filter may be provided on the surface having electrodes of the substrate or may be provided at the outside of the substrate.

Further, dye, pigment or the like may be mixed into the liquid crystal and solidified matrix composite material to conduct a color display.

In drawings:

FIG. 1 is a diagram showing the basis construction of an embodiment of the liquid crystal display element of the present invention;

FIG. 2 is a diagram showing the basic construction of an embodiment of a projection type liquid crystal display apparatus according to the present invention in which the liquid crystal display element is used;

Figure 3:
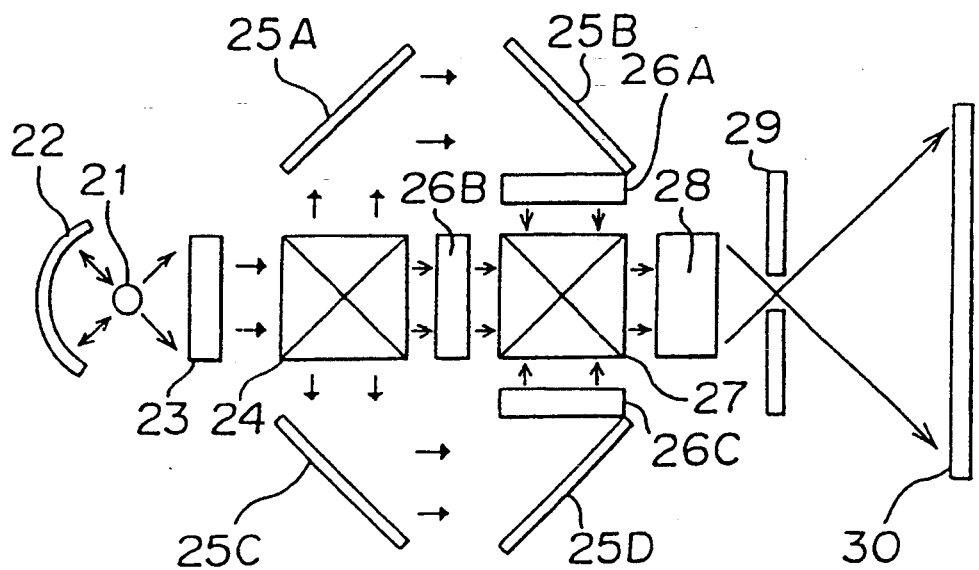
FIG. 3 is a diagram showing an embodiment of the full-color projection type liquid crystal display apparatus of the present invention in which dichroic prisms are used.

Preferred embodiments of the liquid crystal display element and the projection type liquid crystal display apparatus of the present invention will be described with reference to the drawings.

FIG. 1 is a cross-sectional view showing an embodiment of the liquid crystal display element of the present invention.

In FIG. 1, reference numeral 1 designates a liquid crystal display element, numeral 2 designates a substrate such as glass, plastics or the like which is used as an active matrix substrate, numeral 3 designates a picture element electrode such as ITO ($In_2O_3$—$SnO_2$), $SnO_2$ or the like, numeral 4 designates an active element such as a transistor, a diode, a non-linear resistance element or the like, numeral 5 designates a substrate such as glass, plastics or the like which is used as a counter electrode substrate, numeral 6 designates a counter electrode such as ITO, $SnO_2$ or the like, and numeral 7 designates a liquid crystal and solidified matrix composite material interposed between the substrates.

FIG. 2 is a diagram showing an embodiment of the projection type liquid crystal display apparatus in which the liquid display element of the present invention is used.

In FIG. 2, reference numeral 11 designates a projection light source, numeral 12 designates a liquid crystal display element, numeral 13 designates a projection optical system including elements such as a lens, an aperture and so on, and numeral 14 designates a projection screen. In this embodiment, the projection optical system includes an aperture means or spot 15 constituted by a perforated plate, a focusing lens 16 and a projection lens 17.

FIG. 3 is a diagram showing an embodiment of the full-color projection type liquid crystal display apparatus in which dichroic prisms are used, in accordance with the present invention.

In FIG. 3, reference numeral 21 designates a light source, numeral 22 designates a concave mirror, numeral 23 designates a condenser lens, numeral 24 designates a color splitting dichroic prism, numerals 25A, 25B, 25C, 25D designate mirrors, the elements 21 through 25D constituting a color light source, numerals 26A, 26B, 26C designate liquid crystal elements each having a liquid crystal and solidified matrix composite material corresponding to each color, numeral 27 designates a synthesizing dichroic prism, numeral 28 designates a projection lens, numeral 29 designates an aperture for removing light other than straight-forward light and numeral 30 designates a projection screen, the elements 27 through 29 constituting a projection optical system.

In the embodiment shown in FIG. 3, adjustment can be easy because there are provided only one aperture to remove diffusion light other than the straight-forward light and a single optical axis, and the distance to the projection screen can be changed.

Figure 4:
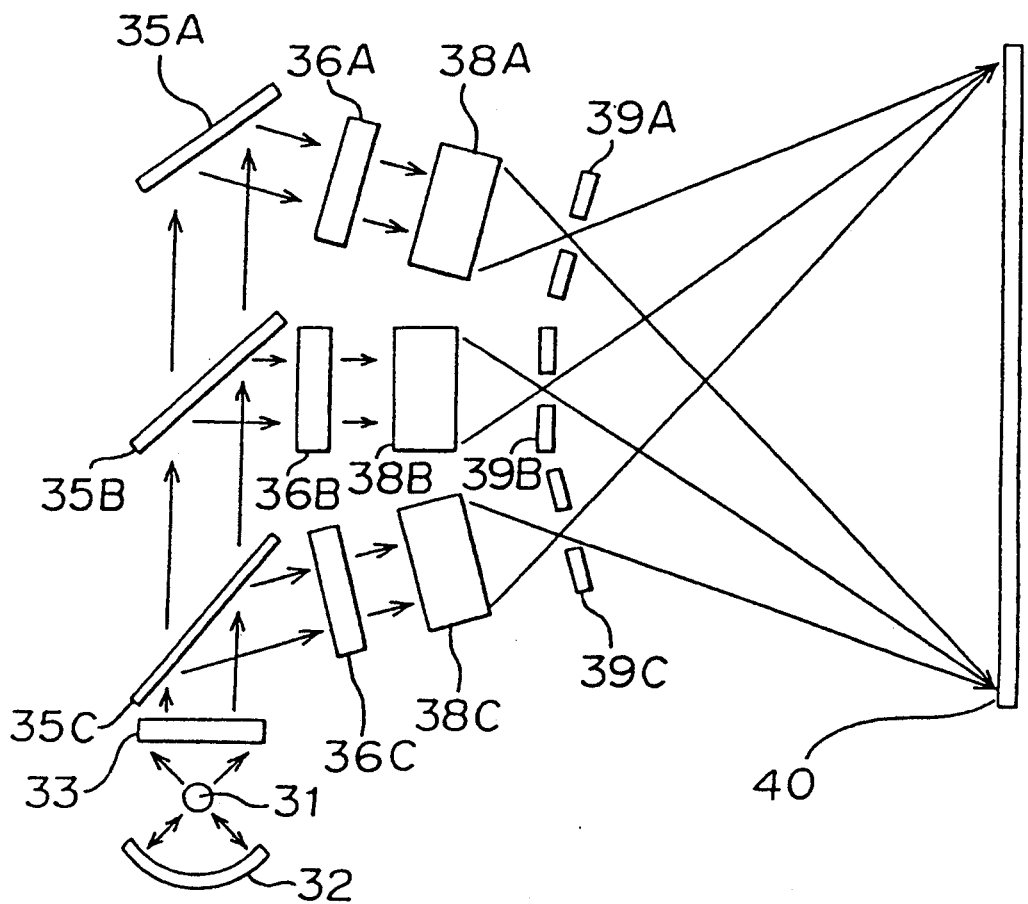
FIG. 4 is a diagram showing an embodiment of the full-color projection type liquid crystal display apparatus of the present invention in which no dichroic prism is used.

FIG. 4 is a diagram showing an embodiment of the full-color projection type liquid crystal display apparatus of the present invention wherein no dichroic prism is used.

In FIG. 4, reference numeral 31 designates a light source, numeral 32 designates a concave mirror, numeral designates a condenser lens, numerals 35A, 35B, 35C designate dichroic mirrors, the elements 31 through 35C constituting a color light source, numerals 36A, 36B, 36C designate liquid crystal display elements each having a liquid crystal and solidified matrix composite material corresponding to each color, numerals 38A, 38B, 38C designate projection lenses provided for each color, numerals 39A, 39B, 39C designate apertures for removing light other than straight-forward light which are respectively provided for different colors, and numeral 40 designates a projection screen, the elements 38A–39C constituting a projection optical system.

In a case of using a three-terminal element such as TFT (thin film transistor) as the active element in accordance with the present invention, a solid electrode (entire surface) in common with all picture elements may be disposed for the counter electrode substrate. In the case of using a two-terminal element such as an MIM element or a PIN diode, however, the counter electrode substrate is applied with a stripe-like patterning.

In the case of using TFT as the active element, silicon is suitable as the semiconductor material. Polycrystalline silicon is particularly preferred since it has less photosensitivity as in amorphous silicon and, accordingly, does not cause erroneous operation even without shielding light from a light source by means of a light shielding film, or with a thin light shielding layer to the active element. In the case of using polycrystalline silicon for the projection type liquid crystal display apparatus in the present invention, a strong light source for projection can be utilized and a bright display is obtainable.

In the case of the conventional TN type liquid crystal display element, a light shielding film is often formed between picture elements so as to suppress the leakage of light from the portion between the picture elements, and a light shielding film can be formed to the active element at the same time of forming the light shielding film between the picture elements. Accordingly, formation of the light shielding film to the active element gives no substantial effect on the entire steps. Namely, if the polycrystalline silicon is used for the active element and the light shielding film is not formed to the active element portion, the number of steps can be decreased if it is required to form the light shielding film at the portion between the picture elements.

On the contrary, in the present invention, the liquid crystal and solidified matrix composite material wherein the refractive index of the solidified matrix substantially agrees with the ordinary refractive index ($n_o$) of the liquid crystal used, is used as described before. Accordingly, light is scattered at the portion not applied with the electric field, and it appears dark on the projection screen. Accordingly, there is no requirement for forming the light shielding film in the portion between the picture elements. Therefore, in the case of using the polycrystalline silicon as the active element, there is no requirement for forming the light shielding film at the active element portion, and accordingly, the step of forming the light shielding film can be eliminated or severe requirements to the light shielding film can be reduced, whereby the number of manufacturing steps can be reduced and the productivity is improved.

Even in the case of using the amorphous silicon, if the light shielding film is formed at the semiconductor portion, the liquid crystal display element of the present invention can be used.

Further, the electrodes used are usually transparent electrodes. In the case of using the electrodes for a reflection type liquid crystal display apparatus, however, a reflection electrode made of a material such as Cr, Al or the like may be used.

In the liquid crystal display element and the liquid crystal display apparatus according to the present invention, an infrared ray cut filter or UV-ray cut filter or the like may be used in a lamination form, or characters, figures or the like may be printed, or a plurality of liquid crystal display element may be used.

Further, in the present invention, a protective plate such s glass plate, a plastic plate or the like may be overlaid on or at the outside of the liquid crystal display element. The protective plate reduces a danger of the breakage of the display element when the surface of the element is pushed, whereby the safety of the display element is improved.

In the case of using a photo-curable compound as a curable compound constituting the liquid crystal and solidified matrix composite material as described above in the present invention, photo-curable vinyl compound is preferably used.

Specifically, there can be exemplified a photo-curable acryl compound and, particularly, those containing acryl oligomer which is curable upon polymerization under the irradiation of light are particularly preferred.

The liquid crystal used in the present invention may be a nematic liquid crystal, especially a nematic liquid crystal having a positive dielectric anisotropy. It is preferable that the refractive index of the solidified matrix agrees with the ordinary refractive index ($n_o$) of the liquid crystal. Such liquid crystal may be used solely or may be used as a composition, and the use of a composition can be advantageous for satisfying various demands such as for working temperature range, working voltage, etc.

When the photo-curable compound is used for the liquid crystal and solidified matrix composite material, it is preferable to uniformly dissolve the photo-curable compound in the liquid crystal. The cured material after exposure to light can not be dissolved or is hardly dissolved. When the above-mentioned composition is used, it is desirable to use the liquid crystal having a closer value in solubility.

The liquid crystal and solidified matrix composite material is prepared as follows. For instance, a pair of substrates are arranged, and the surfaces with electrodes of the substrates are opposed; the circumferential portions of the two substrates opposed are sealed with a sealing material; a mixed solution of an uncured mixture of liquid crystal and curable compound is injected through an injection port followed by sealing the injection port in the same manner as the conventional preparation of the liquid crystal display element. Or a mixture of curable compound and liquid crystal is supplied to one of the substrates, followed by overlaying the other so as to oppose to each other.

For the liquid crystal display element of the present invention, dichroic dye, dye or pigment may be added to the liquid crystal, or a colored material may be used as a curable compound.

In the present invention, when the liquid crystal in the liquid crystal and solidified matrix composite material is utilized as the solvent, and the photo-curable compound is cured by the exposure to light, it is unnecessary to evaporate solvent or water which is needless at the curing time. Accordingly, in this case, the conventional method of preparation of the injection of liquid crystal to the cell can be employed because the curable compound is cured in an enclosed system. The curing of the curable compound in the enclosed system provides high reliability. This can be further assured by the effect obtained by bonding the two substrates with the photo-curable compound.

In the present invention, since the liquid crystal and solidified matrix composite material is used, a possibility that the upper and lower transparent electrodes may short-circuit can be reduced, and it is unnecessary to strictly control the orientation of the liquid crystal and the substrate gap as required for the conventional TN type display element. Accordingly, the liquid crystal display element capable of controlling a transparent state and a scattering state can be effectively produced.

The projection light source, the projection optical system, the projection screen and so on used in the present invention may be a conventionally used light source, projection optical system, projection screen and so on. It is enough that the liquid crystal display element is disposed between the projection light source and the projection optical system. The projection optical system may be used so that images from the plurality of the liquid crystal display elements are synthesized with use of an optical system and the synthesized image is displayed.

As the light source used for the projection light source, there are a halogen lamp, a metal halide lamp, a xenone lamp and so on. Further, a concave mirror, a condenser lens or the like may be combined with the lamp to increase utilization of light.

In addition to the lamp or the combination of the lamp and the mirror or lens, a cooling system may be added, or a TV channel display devise such as LED or the like may be added.

In particular, in the case of using the projection type display, a device for reducing diffusion light, e.g. an aperture or a spot as indicated by numeral 15 in FIG. 2 may be disposed on the optical path so that the contrast ratio of display can be increased. Namely, as the device for reducing diffusion light, it is preferred to use such a device that among incident light passing though the liquid crystal display element, straight-forward light (light which has transmitted portions in which the picture element portions are in a transparent state) is taken, and non-straight-forward light (light scattered at portions in which the liquid crystal and solidified matrix composite material is in a scattering state) is diminished. Such diffusion light reducing device is preferred because the contrast ratio can be improved. In particular, the device which does not reduce the straight-forward light but reduces diffusion light (the non-straight-forward light), is preferred.

FIG. 2 shows a concrete example of the device for reducing diffusion light. The device is constituted by a liquid crystal display element and a projection optical system, specifically, a liquid crystal display element 12, a focussing lens 16, an aperture or a spot 10 which may be a perforated plate and a projection lens 17.

In operation of the device shown in FIG. 2, light emitted from the projection light source passes through the liquid crystal display element 12. Among the light passing through the display element 12, straight-forward light in incident light is collected by the focussing lens 16; the collected light is passed through the aperture or the spot 15 and is projected on the projection screen through the projection lens 17. On the other hand, light which is not straight forward and scatters at the liquid crystal display element 12 does not pass through the aperture or spot 15 even though it is collected by the focussing lens 16. Accordingly, scattered light is not projected, and the contrast ratio can be improved.

As another embodiment, a mirror having a small surface area is arranged obliquely at the same position, instead of the aperture or the spot 15. Light reflected by the mirror is projected through a projection lens disposed on the optical axis of the mirror. Further, a spot or mirror or the like may be disposed at a position where light beams are focused by a projection lens, without using the focussing lens.

The focal length or the diameter of a projecting lens may be suitably selected so as to remove scattering light, without using a specially arranged aperture.

Further, a microlens system can be used. Specifically, a combination of a microlens array and a spot array in which fine holes are formed in array may be disposed at the side of the projection optical system with respect to the liquid crystal display element to thereby remove needless scattering light. This arrangement has an advantage of reducing the entire size of the projection type display apparatus because the optical path length necessary for removing scattering light can be remarkably shortened. In order to reduce the optical path length, the installation of the scattering light removing system in the projection optical system is effective way. The structure of projection type display apparatus in which the scattering light removing system is installed in the projection optical system is simpler than the structure in which the projection optical system and the scattering light removing system are independently disposed, whereby the entire size of the apparatus can be reduced.

These systems may be used in combination with a mirror, a dichroic mirror, a prism, a dichroic prism, a lens and so on to synthesize a picture image and to display a colored image. Further, a colored picture image is obtainable by combining the optical system with a color filter.

The ratio of the scattered light component and the straight-forward light component reaching on the projection screen can be controlled by adjusting the diameter of the spot or the mirror and the focal length of the lens, so that a desired contrast ratio of display and the brightness in display can be obtained.

When the device for reducing diffusion light as shown in FIG. 2 is used, light entering from the projection light source to the liquid crystal display element should be parallel in order to increase the brightness of display. For this, it is preferable to constitute a projection light source by combining a light source capable of providing high brightness (which should be a point light source), a concave mirror, a condenser lens and so on.

Description has been made mainly as to the projection type display apparatus having a transmission type structure. However, the present invention is applicable to a projection type display apparatus having a reflection type structure wherein a small mirror is disposed, instead of a spot, to take out only necessary light.

Although the display element according to the present invention has excellent characteristics as an active matrix liquid crystal display element for a half-tone display, it effectively operates in another-non-active-driving system (a static-driving system or a multiplex-driving system). In particular, it is remarkably advantageous with respect to the multiplex-driving in comparison with the conventional display element. The multiplex-driving system is a driving system in which driving is conducted on the basis of a difference of voltage between an OFF voltage and an ON voltage. In the liquid crystal and solidified matrix composite material, sharpness in the voltage-transmittance characteristics and the presence or absence of the hysteresis greatly influence on the optical characteristics in the multiplex-driving. If the voltage-transmittance characteristics have a sharp threshold value characteristic, the display element is suitable for the multiplex-driving. Since the voltage-transmittance characteristics have a sharp threshold characteristics, the number of lines for simultaneous driving can be increased, it is possible to achieve a display having a higher density. However, when there is a large hysteresis, there appears a difference in the transmittance between a voltage-increasing time and a voltage-decreasing time to thereby invite reduction of contrast ratio and uneven display at the time of multiplex-driving.

In the present invention, the sharp threshold value characteristic and the low hysteresis characteristic can be simultaneously achieved, and accordingly, it is possible to obtain a display having excellent contrast and uniformity which has not been provided in the conventional technique, in the multiplex-driving.

Regarding to the reduction of the hysteresis, there are other techniques such that a strain is applied to the shape of the liquid crystal particles dispersed and modulation is applied to a driving waveform. However, the hysteresis of the display element of the present invention can be reduced with little energy loss, i.e. without increasing the driving voltage. Therefore, it is advantageous in comparison with another technique. The technique of the present invention can be combined with another technique to obtain a synergistic effect in consideration of a liquid crystal used, a matrix material, a driving voltage, a response characteristic and so on.

In accordance with the present invention, a display having a high contrast ratio is obtainable. When the present invention is used for a projection type display, light is passed through a transparent state portion in a transparent-scattering type liquid crystal display elements; a projection screen is brightly displayed; light is scattered at a scattering state portion whereby the projection screen is displayed dark. Thus, a display having a desired brightness and a high contrast ratio can be obtained.

In the present invention having the construction described above, the hysteresis is reduced and image-sticking is reduced. Accordingly, a clear half-tone display is possible, and a dynamic display having a fine gradation can be easily obtained with use of an active element and a driving IC which have been used for the conventional TN active matrix liquid crystal display element.

In the following, the present invention will be described more in detail in connection with various examples.

EXAMPLE 1

A nematic liquid crystal of a positive dielectric anisotropy having 10.5 of dielectric anisotropy $\Delta\epsilon_{LC}$, 0.24 of refractive index anisotropy $\Delta n$, $12 \times 10^{-12}N$ of elastic constant K11, $15 \times 10^{-12}N$ of K33, and about 35 cSt of viscosity $\eta$, acrylate monomer, urethane acrylate oligomer, and a photo-cure initiator were uniformly dissolved to prepare an uncured mixture.

An active matrix substrate having polycrystal silicon TFT for each picture element and a counter electrode substrate on which a solid electrode (entire surface) is formed were sealed at their peripheral portions with use of a sealing material to thereby prepare a cell having an electrode substrate gap of 13 $\mu$m.

The uncured mixture was injected to the cell, and it was exposed to UV-rays to cure the mixture to thereby form a liquid crystal and solidified matrix composite material. The driving voltage of the liquid crystal display element was about 7 V.

When the dielectric constant $\epsilon_M$ was measured by the application of a voltage (0.3 V) which is lower than the threshold value voltage, it was found that the dielectric constant was about 8.7 in terms of 1 kHz. When the liquid crystal display element was driven with a video signal, a dynamic display having an excellent half-tone display was obtained. There was found no image-sticking (residual image remaining over several seconds or more) at the time of changing a picture image.

The liquid crystal display element was combined with a light source system and a projection optical system to prepare a projection type display apparatus. When a picture image was projected on the screen, a very bright dynamic picture image (video image) having an excellent half-tone display could be obtained. Measurement of the contrast ratio on the screen resulted about 150:1. The collection cone angle (which is determined by $2 \tan^{-1}(\Phi/2\ f)$, in which $\Phi$ is the diameter of the aperture (spot) and f is the focal length of the lens) of the projection optical system was about 5° in total angle.

EXAMPLES 2 TO 5 AND COMPARATIVE
EXAMPLES 1 TO 4

Liquid crystal display elements were prepared in the same manner as in Example 1 except that in the liquid crystal used, dielectric anisotropy and the refractive index anisotropy were changed. The electrode substrate gap was adjusted for each liquid crystal display element in order to make the driving voltage uniform.

The driving voltage used was 7 V for all the display elements. The dielectric anisotropy $\Delta\epsilon_{LC}$, the refractive index anisotropy $\Delta n$, the electrode substrate gap d ($\mu$m), the dielectric constant $\epsilon_M$ (1 kHz) at 0.3 V of the liquid crystal and solidified matrix composite material, the elastic constant K11 ($\times 10^{-12}N$), K33 ($\times 10^{-12}N$), the viscosity $\eta$ (cSt) of the liquid crystal, the contrast ratio CR on the screen when the same optical system as that in Example 1 was used to form a projection type display, and the hysteresis H were measured for respective liquid crystal display elements. Results are shown in Table 1.

TABLE 1

| Example | $\Delta\epsilon_{LC}$ | $\Delta n$ | d | $\epsilon_M$ | K11 | K33 | $\eta$ | CR | H | Evaluation |
|---|---|---|---|---|---|---|---|---|---|---|
| Comparative Example 1 | 9.9 | 0.17 | 16.0 | 8.2 | | | | 30 | 0.07 | × |
| Example 2 | 9.8 | 0.23 | 14.0 | 8.1 | | | | 130 | 0.08 | ⊙ |
| Example 3 | 11.6 | 0.24 | 13.5 | 8.7 | | | | 140 | 0.15 | ⊙ |
| Example 4 | 11.6 | 0.24 | 13.5 | 7.2 | | | | 140 | 0.25 | ○ |
| Example 5 | 10.5 | 0.21 | 14.0 | 8.2 | 17 | 15 | 34 | 180 | 0.06 | ⊙ |
| Comparative Example 2 | 13.8 | 0.24 | 13.5 | 9.1 | | | | 140 | 0.45 | × |
| Comparative Example 3 | 15.6 | 0.25 | 12.5 | 10.1 | 13 | 18 | 54 | 150 | 0.80 | × |
| Comparative Example 4 | 17.0 | 0.28 | 11.5 | 10.8 | | | | 150 | 1.00 | × |

The values of the hysteresis in Table 1 show relative values wherein the magnitude of the hysteresis in the voltage-transmittance characteristics of Comparative Example 4 is determined as 1. The average diameter of the liquid crystal in the liquid crystal and solidified matrix composite material was about 2.0 μm.

The clearing point Tc, the average particle diameter R of the liquid crystal used in Example 5 were respectively 80° C. and about 2.5 μm. The driving voltage to the liquid crystal display element of Example 5 was about 7 V. The temperature condition for the liquid crystal display element was changed and the contrast ratio was measured on the screen. It was found that there was no substantial change in the contrast ratio at the element temperature of 10°–60° C. (ambient temperature: 0°–50° C.), and a value of about 120 or higher was obtained. Further, the voltage $V_{50}$ corresponding to a transmittance of 50% of the saturated transmittance did not show a substantial change to temperature, and it indicated 4.8 V and 4.0 V at 10° C. and 60° C. respectively.

When light entering into the liquid crystal display element was changed in the order of red, green and blue, the element showed a high contrast ratio as about 120 or higher to any of the color at 30° C. of element temperature (ambient temperature=20° C.).

The clearing point Tc of the liquid crystal used in Comparative Example 3 was 70° C., and the driving voltage to the liquid crystal display element was about 8 V. The temperature condition for the liquid crystal display element was changed and the contrast ratio was measured on the screen. As a result, the contrast ratio was greatly changed at an element temperature of 10°–60° C. (ambient temperature: 0°–50°). Namely, the contrast ratio was about 170 at the element temperature of 10° C. and about 7 at 60° C. The contrast ratio showed about 100 or higher in a range of 10°–35° C. The voltage $V_{50}$ indicating the transmittance of 50% of the saturated transmittance was greatly changed to temperature. The voltage was 6.3 V and 2.6 V at 10° C. and 60° C. respectively. Light entering into the liquid crystal display element was changed in the order of red, green and blue. The element showed a high contrast ratio as about 120 or higher to green and blue at 30° C. of element temperature (ambient temperature: 20° C.), however, it showed a contrast ratio of about 60 to red.

EXAMPLE 6

Liquid crystal display elements were prepared in the same manner as in Example 1 except for the electrode substrate gaps $d_R$, $d_G$ and $d_B$ and average liquid crystal particle diameters $R_R$, $R_G$ and $R_B$ for R, G and B. Namely, $d_R=14.5$ μm and $R_R=2.1$ μm for R, $d_G=12.0$ μm and $R_G=1.9$ μm for G, and $d_B=10.5$ μm and $R_B=1.7$ μm for B.

Three liquid crystal display elements thus prepared were disposed in the paths of light splitted by dichroic mirrors so that the splitted light were synthesized again for projection. The same projection light source and projection optical system as in Example 1 were used.

By the color projection type liquid crystal display apparatus, a projected picture image having a high contrast ratio and a clear half-tone without image-sticking could be obtained. Further, the projected picture image has good chromatic balance could be obtained without conducting complicated color adjustment at the side of a driving circuit.

EXAMPLE 7

Liquid crystal display elements were prepared in the same manner as in Example 1 except for electrode substrate gaps $d_R$, $d_G$ and $d_B$ for R, G and B. Namely, $d_R=12.5$ μm for R, $d_G=11.0$ μm for G and $d_B=10.5$ μm for B. The average diameter of liquid crystal particles was R=1.8 μm.

Three liquid crystal display elements thus prepared were arranged in the same manner as in Example 6 to thereby constitute a projection type liquid crystal display apparatus. In the color projection type liquid crystal display apparatus, although the contrast ratio was slightly lower than that of Example 6, a projected picture image having a high contrast ratio and a clear half-tone could be obtained without image-sticking. Further, the projected picture image had good chromatic balance could be obtained without conducting complicated color adjustment at the side of a driving circuit.

EXAMPLE 8

Three liquid crystal display elements were prepared in the substantially same manner as in Example 3. A color projection type display apparatus was constituted by using a reflection type projection optical system in which the dimension of the electrode substrate gaps are all 11 μm: the liquid crystal display elements were made correspondence to the three colors of R, G and B: the picture element electrodes were made of aluminum: and a single dichroic prism was used in common for color-splitting and color-synthesizing.

When the display apparatus was driven by the application of the maximum application voltage of 8 V, a display having high brightness and excellent half-tone could be obtained. The contrast ratio on the screen was about 100. The collection cone angle of the projection optical system was about 10°. Since there were some difference in the voltage dependence of the transmittance of the elements to respective kinds of color, driving voltage was changed for each color to obtain a balance of color. As a result, a colored dynamic image display could be obtained.

In the liquid crystal display element of the present invention, since a liquid crystal and solidified matrix composite material which electrically controls a scattering state and a transparent state is used as a liquid crystal material and the liquid crystal and solidified matrix composite material is held between a pair of substrates such as an active matrix substrate and a counter electrode substrate, polarization plates are unnecessary, whereby the transmittance of light in a light-transparent state can be remarkably improved.

The liquid crystal display element of the present invention, in which a nematic liquid crystal having a positive dielectric anisotropy is used and the refractive index of a solidified matrix substantially agrees with the ordinary refractive index ($n_0$) of liquid crystal used, exhibits high scattering property under the condition that no electric field is applied and high transparent property under the condition that an electric field is applied. Accordingly, it has a high contrast ratio and a display of high brightness is possible even when a conventional driving IC for a TN type liquid crystal display element is used.

In accordance with the present invention, it is possible to obtain a gray scale display having a clear half-tone when gray scale driving is conducted, and to reduce an image-sticking phenomenon due to the hysteresis.

Accordingly, the liquid crystal display element of the present invention is effective to a projection type display, and a projection type display apparatus having no or little image-sticking, high brightness, and good contrast ratio can be obtained. Further, it is possible to reduce the size of a light source.

In the liquid crystal display element of the present invention, a change of scattering property due to temperature is small and a change of voltage-transmittance characteristics due to temperature is small. Accordingly, gradation-driving can be stable and easy in a broad temperature range.

Further, since it is unnecessary to use the polarization plates, the wavelength dependency of the optical characteristics is small and there is little requirement for color correction for the light source.

Further, possible problems of orientation processing such as rubbing necessary for the TN type liquid crystal display element and destruction of the active element due to the orientation processing and static electricity generated from the processing can be avoided, and the yield of production of the liquid crystal display elements can be improved significantly.

Since the liquid crystal and solidified matrix composite material is formed in a form of film after curing, such problems of short-circuiting between the substrate by a pressure applied thereon and destruction of the active elements by displacement of spacers can be minimized.

Further, the liquid crystal and solidified matrix composite material is similar in specific resistance to that in the conventional TN mode, and great storage capacitor need not be provided for each picture elements as in the DS mode. Accordingly, designing of the active elements can be facilitated and the ratio of an effective picture element electrode area can be increased, and power consumption of the liquid crystal display element can be small.

Further, since the liquid crystal display element can be produced only by eliminating the orientation film forming step from a conventional process of production of the liquid crystal element of the TN mode, production of the element can be easy.

The liquid crystal display element which employs the liquid crystal and solidified matrix composite material has a feature that the response time is short, and a display of dynamic picture can be made easily. Further, since the electric-optical characteristics (voltage-transmittance dependence) of the liquid crystal display element is looser than a conventional liquid crystal display element of the TN mode, it can be easily applied to display gray scale.

In addition, when the liquid crystal display element of the present invention is rendered to be in transparent state upon application of an electric field, light is scattered by a portion to which no electric field is applied and there is no leak of light upon projection of light even if a light shielding layer for interrupting light is not provided at the portion other than picture elements. Accordingly, there is no necessity of provision of a light shielding means between adjacent picture elements. Accordingly, where an active element made of polysilicon is used, a projection light source of a high brightness can be used without using a light shielding layer or with a thin light shielding layer to the active element, whereby a projection type liquid crystal display apparatus of a high brightness can be easily obtained. Further, no light shielding layer is necessary in this instance, and accordingly, the process of production can be simplified.

In the present invention, various applications are possible as far as the effect by the present invention is not injured.

What is claimed is:

1. A gray scale liquid crystal display element comprising
    a pair of substrates provided with electrodes and
    a liquid crystal and solidified matrix composite material, disposed between said pair of substrates which includes a nematic liquid crystal dispersed and held in a solidified matrix,
    said nematic liquid crystal being such that the refractive index of said liquid crystal is changed depending on states of applying a voltage wherein in one state the refractive index of said liquid crystal substantially coincides with that of said solidified matrix to thereby pass light, and in another state the former does not coincide with the latter to thereby cause the scattering of light, characterized in that the refractive index anisotropy $\Delta n$ of said liquid crystal used is $0.20 \leq \Delta n$,
    and the dielectric anisotropy $\Delta \epsilon_{LC}$ of said liquid crystal used satisfies the relationship of $5 < \Delta \epsilon_{LC} < 13$,
    and the average particle diameter R ($\mu m$) of said liquid crystal and solidified matrix composite material satisfies the relationship of $0.2 < R \cdot \Delta n < 0.7$,
    and the dielectric constant $\epsilon_M$ of said liquid crystal and solidified matrix composite material, satisfies the relationship of $\Delta \epsilon_{LC} < 1.45 \ \epsilon_M$,
    and the elastic constant K33 ($10^{-12}$N) of said liquid crystal in said liquid crystal and solidified matrix composite material satisfies the relationship of $4(K33/\eta)^{0.5} > R > (K33/\Delta \epsilon_{LC})^{0.5}$.

2. A gray scale liquid crystal display element comprising
    a pair of substrates provided with electrodes and
    a liquid crystal and solidified matrix composite material, disposed between said pair of substrates which includes a nematic liquid crystal dispersed and held in a solidified matrix,
    said nematic liquid crystal being such that the refractive index of said liquid crystal is changed depending on states of applying a voltage wherein in one state the refractive index of said liquid crystal substantially coincides with that of said solidified matrix to thereby pass light, and in another state the former does not coincide with the latter to thereby cause the scattering of light, characterized in that the refractive index anisotropy $\Delta n$ of said liquid crystal used is $0.20 \leq \Delta n$,
    and the dielectric anisotropy $\Delta \epsilon_{LC}$ of said liquid crystal used satisfies the relationship of $5 < \Delta \epsilon_{LC} < 13$,
    and the average particle diameter R ($\mu m$) of said liquid crystal and solidified matrix composite material satisfies the relationship of $0.2 < R \cdot \Delta n < 0.7$,
    and the viscosity $\eta$ (cSt) of said liquid crystal satisfies the relationship of $\Delta n^2/\eta > 0.0014$,
    and the elastic constant K33 ($10^{-12}$N) of said liquid crystal in said liquid crystal and solidified matrix composite material satisfies the relationship of $4(K33/\eta)^{0.5} > R > (K33/\Delta \epsilon_{LC})^{0.5}$.

3. A gray scale liquid crystal display element comprising
    a pair of substrates provided with electrodes and a liquid crystal and solidified matrix composite material, disposed between said pair of substrates which includes a nematic liquid crystal dispersed and held in a solidified matrix, said nematic liquid crystal being such that the refractive index of said liquid crystal is changed depending on states of applying a voltage wherein in one state the refractive index of said liquid crystal substantially coincides with that of said solidified matrix to thereby pass light, and in another state the former does not coincide with the latter to thereby cause the scattering of light, characterized in that the refractive index anisotropy $\Delta n$ of said liquid crystal used is $0.20 \leq \Delta n$, and the dielectric anisotropy $\Delta \epsilon_{LC}$ of said liquid crystal used satisfies the relationship of $5 < \Delta \epsilon_{LC} < 13$, and the average particle diameter R ($\mu$m) of said liquid crystal and solidified matrix composite material satisfies the relationship of $0.2 < R \cdot \Delta n < 0.7$, and the electrode substrate gap d ($\mu$m) and the maximum effective voltage V applied to said liquid crystal and solidified matrix composite satisfies the relationship of $$3 \cdot R < d < 9 \cdot R$$

and $$0.6 R \cdot V < d < 1.6 R \cdot V.$$

4. A gray scale liquid crystal display element comprising a pair of substrates provided with electrodes and a liquid crystal and solidified matrix composite material, disposed between said pair of substrates which includes a nematic liquid crystal dispersed and held in a solidified matrix, said nematic liquid crystal being such that the refractive index of said liquid crystal is changed depending on states of applying a voltage wherein in one state the refractive index of said liquid crystal substantially coincides with that of said solidified matrix to thereby pass light, and in another state the former does not coincide with the latter to thereby cause the scattering of light, characterized in that the refractive index anisotropy $\Delta n$ of said liquid crystal used is $0.20 \leq \Delta n$, and the dielectric anisotropy $\Delta \epsilon_{LC}$ of said liquid crystal used satisfies the relationship of $5 < \Delta \epsilon_{LC} < 13$, and the average particle diameter R ($\mu$m) of said liquid crystal and solidified matrix composite material satisfies the relationship of $0.2 < R \cdot \Delta n < 0.7$, and the dielectric constant $\epsilon_M$ of said liquid crystal and solidified matrix composite material, satisfies the relationship of $\Delta \epsilon_{LC} < 1.45 \epsilon_M$, and the electrode substrate gap d ($\mu$m) and the maximum effective voltage V applied to said liquid crystal and solidified matrix composite satisfies the relationship of $$3 \cdot R < d < 9 \cdot R$$

and $$0.6 R \cdot V < d < 1.6 R \cdot V.$$

5. A gray scale liquid crystal display element comprising a pair of substrates provided with electrodes and a liquid crystal and solidified matrix composite material, disposed between said pair of substrates which includes a nematic liquid crystal dispersed and held in a solidified matrix, said nematic liquid crystal being such that the refractive index of said liquid crystal is changed depending on states of applying a voltage wherein in one state the refractive index of said liquid crystal substantially coincides with that of said solidified matrix to thereby pass light, and in another state the former does not coincide with the latter to thereby cause the scattering of light, characterized in that the refractive index anisotropy $\Delta n$ of said liquid crystal used is $0.20 \leq \Delta n$, and the dielectric anisotropy $\Delta \epsilon_{LC}$ of said liquid crystal used satisfies the relationship of $5 < \Delta \epsilon_{LC} < 13$, and the average particle diameter R ($\mu$m) of said liquid crystal and solidified matrix composite material satisfies the relationship of $0.2 < R \cdot \Delta n < 0.7$, and the viscosity $\eta$ (cSt) of said liquid crystal satisfies the relationship of $\Delta n^2 / \eta > 0.0014$, and the electrode substrate gap d ($\mu$m) and the maximum effective voltage V applied to said liquid crystal and solidified matrix composite satisfies the relationship of $$3 \cdot R < d < 9 \cdot R$$

and $$0.6 R \cdot V < d < 1.6 R \cdot V.$$

6. A gray scale liquid crystal display element comprising a pair of substrates provided with electrodes and a liquid crystal and solidified matrix composite material, disposed between said pair of substrates which includes a nematic liquid crystal dispersed and held in a solidified matrix, said nematic liquid crystal being such that the refractive index of said liquid crystal is changed depending on states of applying a voltage wherein in one state the refractive index of said liquid crystal substantially coincides with that of said solidified matrix to thereby pass light, and in another state the former does not coincide with the latter to thereby cause the scattering of light, characterized in that the refractive index anisotropy $\Delta n$ of said liquid crystal used is $0.20 \leq \Delta n$, and the dielectric anisotropy $\Delta \epsilon_{LC}$ of said liquid crystal used satisfies the relationship of $5 < \Delta \epsilon_{LC} < 13$, and said liquid crystal dispersed and held in said solidified matrix is in the shape of an ellipse rotated about a long axis, wherein the long axes of said liquid crystal particles are arranged at random, with respect to a line normal to an electrode surface.

7. A gray scale liquid crystal display element comprising a pair of substrates provided with electrodes and a liquid crystal and solidified matrix composite material, disposed between said pair of substrates which includes a nematic liquid crystal dispersed and held in a solidified matrix, said nematic liquid crystal being such that the refractive index of said liquid crystal is changed depending on states of applying a voltage wherein in one state the refractive index of said liquid crystal substantially coincides with that of said solidified matrix to thereby pass light, and in another state the former does not coincide with the latter to thereby cause the scattering of light, characterized in that the refractive index anisotropy $\Delta n$ of said liquid crystal used is $0.20 \leq \Delta n$, and the dielectric anisotropy $\Delta \epsilon_{LC}$ of said liquid crystal used satisfies the relationship of $5 < \Delta \epsilon_{LC} < 13$, and the dielectric constant $\epsilon_M$ of said liquid crystal and solidified matrix composite material, satisfies the relationship of $\Delta \epsilon_{LC} < 1.45 \epsilon_M$, and said liquid crystal dispersed and held in said solidified matrix is in the shape of an ellipse rotated about a long axis, wherein the long axes of said liquid crystal particles are arranged at random, with respect to a line normal to an electrode surface.

8. A gray scale liquid crystal display element comprising a pair of substrates provided with electrodes and a liquid crystal and solidified matrix composite material, disposed between said pair of substrates which includes a nematic liquid crystal dispersed and held in a solidified matrix, said nematic liquid crystal being such that the refractive index of said liquid crystal is changed depending on states of applying a voltage wherein in one state the refractive index of said liquid crystal substantially coincides with that of said solidified matrix to thereby pass light, and in another state the former does not coincide with the latter to thereby cause the scattering of light, characterized in that the refractive index anisotropy $\Delta n$ of said liquid crystal used is $0.20 \leq \Delta n$, and the dielectric anisotropy $\Delta \epsilon_{LC}$ of said liquid crystal used satisfies the relationship of $5 < \Delta \epsilon_{LC} < 13$, and the viscosity $\eta$ (cSt) of said liquid crystal satisfies the relationship of $\Delta n^2/\eta > 0.0014$, and said liquid crystal dispersed and held in said solidified matrix is in the shape of an ellipse rotated about a long axis, wherein the long axes of said liquid crystal particles are arranged at random, with respect to a line normal to an electrode surface.

9. The gray scale liquid crystal display element of any one of claims 1–8 wherein said solidified matrix is formed by evaporating solvent or water and curing a curable compound.

10. The gray scale liquid crystal display element of any one of claims 1–8 wherein said solidified matrix is formed by curing a photo-curable or heat-curable compound.

11. The gray scale liquid crystal display element of any one of claims 1–8 wherein said solidified matrix is a polymer matrix formed by curing a photo-curable acryl compound.

12. The gray scale liquid crystal display element of any one of claims 1–8 wherein said solidified matrix is a polymer matrix formed by curing a photo-curable acryl compound containing acrylate oligomer.

13. The gray scale liquid crystal display element of any one of claims 1–8 wherein $\Delta \epsilon_{LC} \leq 11.6$ and $\Delta n \leq 0.24$ and said solidified matrix is a polymer matrix formed by curing a curable compound.

14. The gray scale liquid crystal display element of any one of claims 1–8 wherein said long axes of said liquid crystal particles are arranged at random in a three-dimensional manner.

15. A projection type gray scale liquid crystal display apparatus comprising in combination a projection light source, a projection optical system and a liquid crystal display element comprising a pair of substrates provided with electrodes and a liquid crystal and solidified matrix composite material, disposed between said pair of substrates, which includes a nematic liquid crystal dispersed and held in a solidified matrix, said nematic liquid crystal being such that the refractive index of said liquid crystal is changed depending on states of applying a voltage wherein in one state the refractive index of said liquid crystal substantially coincides with that of said solidified matrix to thereby pass light, and in another state the former does not coincide with the latter to thereby cause the scattering of light, characterized in that the refractive index anisotropy $\Delta n$ of said liquid crystal used is $0.20 \leq \Delta n$, and the dielectric anisotropy $\Delta \epsilon_{LC}$ of said liquid crystal used satisfies the relationship of $5 < \Delta \epsilon_{LC} < 13$, and the average particle diameter R ($\mu$m) of said liquid crystal and solidified matrix composite material satisfies the relationship of $0.2 < R \cdot \Delta n < 0.7$, and the dielectric constant $\epsilon_M$ of said liquid crystal and solidified matrix composite material, satisfies the relationship of $\Delta \epsilon_{LC} < 1.45 \epsilon_M$, and the elastic constant K33 ($10^{-12}$N) of said liquid crystal in said liquid crystal and solidified matrix composite material satisfies the relationship of $4(K33/\eta)^{0.5} > R > (K33/\Delta \epsilon_{LC})^{0.5}$.

16. A projection type gray scale liquid crystal display apparatus comprising in combination a projection light source, a projection optical system and a liquid crystal display element comprising a pair of substrates provided with electrodes and a liquid crystal and solidified matrix composite material, disposed between said pair of substrates, which includes a nematic liquid crystal dispersed and held in a solidified matrix, said nematic liquid crystal being such that the refractive index of said liquid crystal is changed depending on states of applying a voltage wherein in one state the refractive index of said liquid crystal substantially coincides with that of said solidified matrix to thereby pass light, and in another state the former does not coincide with the latter to thereby cause the scattering of light, characterized in that the refractive index anisotropy $\Delta n$ of said liquid crystal used is $0.20 \leq \Delta n$, and the dielectric anisotropy $\Delta \epsilon_{LC}$ of said liquid crystal used satisfies the relationship of $5 < \Delta \epsilon_{LC} < 13$, and the average particle diameter R ($\mu$m) of said liquid crystal and solidified matrix composite material satisfies the relationship of $0.2 < R \cdot \Delta n < 0.7$, and the viscosity $\eta$ (cSt) of said liquid crystal satisfies the relationship of $\Delta n^2/\eta > 0.0014$, and the elastic constant K33 ($10^{-12}$N) of said liquid crystal in said liquid crystal and solidified matrix composite material satisfies the relationship of $4(K33/\eta)^{0.5} > R > (K33/\Delta \epsilon_{LC})^{0.5}$.

17. A projection type gray scale liquid crystal display apparatus comprising in combination a projection light source, a projection optical system and
a liquid crystal display element comprising
a pair of substrates provided with electrodes and
a liquid crystal and solidified matrix composite material, disposed between said pair of substrates, which includes a nematic liquid crystal dispersed and held in a solidified matrix,
said nematic liquid crystal being such that the refractive index of said liquid crystal is changed depending on states of applying a voltage wherein in one state the refractive index of said liquid crystal substantially coincides with that of said solidified matrix to thereby pass light, and in another state the former does not coincide with the latter to thereby cause the scattering of light, characterized in that the refractive index anisotropy $\Delta n$ of said liquid crystal used is $0.20 \leq \Delta n$,
and the dielectric anisotropy $\Delta \epsilon_{LC}$ of said liquid crystal used satisfies the relationship of $5 < \Delta \epsilon_{LC} < 13$,
and the average particle diameter R ($\mu$m) of said liquid crystal and solidified matrix composite material satisfies the relationship of $0.2 < R \cdot \Delta n < 0.7$,
and the electrode substrate gap d ($\mu$m) and the maximum effective voltage V applied to said liquid crystal and solidified matrix composite satisfies the relationship of $$3 \cdot R < d < 9 \cdot R$$

and $$0.6R \cdot V < d < 1.6R \cdot V.$$

18. A projection type gray scale liquid crystal display apparatus comprising in combination
a projection light source,
a projection optical system and
a liquid crystal display element comprising
a pair of substrates provided with electrodes and
a liquid crystal and solidified matrix composite material, disposed between said pair of substrates, which includes a nematic liquid crystal dispersed and held in a solidified matrix,
said nematic liquid crystal being such that the refractive index of said liquid crystal is changed depending on states of applying a voltage wherein in one state the refractive index of said liquid crystal substantially coincides with that of said solidified matrix to thereby pass light, and in another state the former does not coincide with the latter to thereby cause the scattering of light, characterized in that the refractive index anisotropy $\Delta n$ of said liquid crystal used is $0.20 \leq \Delta n$,
and the dielectric anisotropy $\Delta \epsilon_{LC}$ of said liquid crystal used satisfies the relationship of $5 < \Delta \epsilon_{LC} < 13$,
and the average particle diameter R ($\mu$m) of said liquid crystal and solidified matrix composite material satisfies the relationship of $0.2 < R \cdot \Delta n < 0.7$,
and the dielectric constant $\epsilon_M$ of said liquid crystal and solidified matrix composite material, satisfies the relationship of $\Delta \epsilon_{LC} < 1.45 \, \epsilon_M$,
and the electrode substrate gap d ($\mu$m) and the maximum effective voltage V applied to said liquid crystal and solidified matrix composite satisfies the relationship of $$3 \cdot R < d < 9 \cdot R$$

and $$0.6R \cdot V < d < 1.6R \cdot V.$$

19. A projection type gray scale liquid crystal display apparatus comprising in combination
a projection light source,
a projection optical system and
a liquid crystal display element comprising
a pair of substrates provided with electrodes and
a liquid crystal and solidified matrix composite material, disposed between said pair of substrates, which includes a nematic liquid crystal dispersed and held in a solidified matrix,
said nematic liquid crystal being such that the refractive index of said liquid crystal is changed depending on states of applying a voltage wherein in one state the refractive index of said liquid crystal substantially coincides with that of said solidified matrix to thereby pass light, and in another state the former does not coincide with the latter to thereby cause the scattering of light, characterized in that the refractive index anisotropy $\Delta n$ of said liquid crystal used is $0.20 \leq \Delta n$,
and the dielectric anisotropy $\Delta \epsilon_{LC}$ of said liquid crystal used satisfies the relationship of $5 < \Delta \epsilon_{LC} < 13$,
and the average particle diameter R ($\mu$m) of said liquid crystal and solidified matrix composite material satisfies the relationship of $0.2 < R \cdot \Delta n < 0.7$,
and the viscosity $\eta$ (cSt) of said liquid crystal satisfies the relationship of $\Delta n^2 / \eta > 0.0014$,
and the electrode substrate gap d ($\mu$m) and the maximum effective voltage V applied to said liquid crystal and solidified matrix composite satisfies the relationship of $$3 \cdot R < d < 9 \cdot R$$

and $$0.6R \cdot V < d < 1.6R \cdot V.$$

20. A projection type gray scale liquid crystal display apparatus comprising in combination
a projection light source,
a projection optical system and
a liquid crystal display element comprising
a pair of substrates provided with electrodes and
a liquid crystal and solidified matrix composite material, disposed between said pair of substrates, which includes a nematic liquid crystal dispersed and held in a solidified matrix,
said nematic liquid crystal being such that the refractive index of said liquid crystal is changed depending on states of applying a voltage wherein in one state the refractive index of said liquid crystal substantially coincides with that of said solidified matrix to thereby pass light, and in another state the former does not coincide with the latter to thereby cause the scattering of light, characterized in that the refractive index anisotropy $\Delta n$ of said liquid crystal used is $0.20 \leq \Delta n$,
and the dielectric anisotropy $\Delta \epsilon_{LC}$ of said liquid crystal used satisfies the relationship of $5 < \Delta \epsilon_{LC} < 13$,
and said liquid crystal dispersed and held in said solidified matrix is in the shape of an ellipse rotated about a long axis, wherein the long axes of said liquid crystal particles are arranged at random, with respect to a line normal to an electrode surface.

21. A projection type gray scale liquid crystal display apparatus comprising in combination
a projection light source,
a projection optical system and
a liquid crystal display element comprising
a pair of substrates provided with electrodes and
a liquid crystal and solidified matrix composite material, disposed between said pair of substrates, which includes a nematic liquid crystal dispersed and held in a solidified matrix,
said nematic liquid crystal being such that the refractive index of said liquid crystal is changed depending on states of applying a voltage wherein in one state the refractive index of said liquid crystal substantially coincides with that of said solidified matrix to thereby pass light, and in another state the former does not coincide with the latter to thereby cause the scattering of light, characterized in that the refractive index anisotropy $\Delta n$ of said liquid crystal used is $0.20 \leq \Delta n$,
and the dielectric anisotropy $\Delta \epsilon_{LC}$ of said liquid crystal used satisfies the relationship of $5 < \Delta \epsilon_{LC} < 13$,
and the dielectric constant $\epsilon_M$ of said liquid crystal and solidified matrix composite material, satisfies the relationship of $\Delta \epsilon_{LC} < 1.45 \, \epsilon_M$,
and said liquid crystal dispersed and held in said solidified matrix is in the shape of an ellipse rotated about a long axis, wherein the long axes of said liquid crystal particles are arranged at random, with respect to a line normal to an electrode surface.

22. A projection type gray scale liquid crystal display apparatus comprising in combination
a projection light source,
a projection optical system and
a liquid crystal display element comprising
a pair of substrates provided with electrodes and
a liquid crystal and solidified matrix composite material, disposed between said pair of substrates, which includes a nematic liquid crystal dispersed and held in a solidified matrix,
said nematic liquid crystal being such that the refractive index of said liquid crystal is changed depending on states of applying a voltage wherein in one state the refractive index of said liquid crystal substantially coincides with that of said solidified matrix to thereby pass light, and in another state the former does not coincide with the latter to thereby cause the scattering of light, characterized in that the refractive index anisotropy $\Delta n$ of said liquid crystal used is $0.20 \leq \Delta n$,
and the dielectric anisotropy $\Delta \epsilon_{LC}$ of said liquid crystal used satisfies the relationship of $5 < \Delta \epsilon_{LC} < 13$,
and the viscosity $\eta$ (cSt) of said liquid crystal satisfies the relationship of $\Delta n^2 / \eta > 0.0014$,
and said liquid crystal dispersed and held in said solidified matrix is in the shape of an ellipse rotated about a long axis, wherein the long axes of said liquid crystal particles are arranged at random, with respect to a line normal to an electrode surface.

23. The projection type gray scale liquid crystal display apparatus of any one of claims 15-22 wherein three liquid crystal display elements are arranged, and
said projection light source comprises a light source and a dichroic means as a color-splitting optical system;
said projection optical system comprises a dichroic means as a color-synthesizing optical system and a projection lens;
whereby light is split into three kinds of color, R, G, and B, each color light being passed through each liquid crystal display element, being subjected to color synthesis and the synthesized light being projected through said projection lens.

24. The projection type gray scale liquid crystal display apparatus of any one of claims 15-22 wherein an aperture for reducing diffusion light is disposed between said liquid crystal display element and said projection optical system, or in said projection optical system.

25. The projection type gray scale liquid crystal display apparatus of any one of claims 15-22 wherein three liquid crystal display elements for splitting light into three kinds of color, R, G, and B light are arranged and electrode substrate gaps $d_R$, $d_G$, and $d_B$ of the respective liquid crystal display elements have the relationship $$d_R > d_G > d_B$$

or an average liquid crystal particle diameter $R_R$, $R_G$, and $R_B$ of the respective liquid crystal display elements have the relationship $$R_R > R_G > R_B.$$

26. The projection type gray scale liquid crystal display apparatus of any one of claims 20-22 wherein said long axes of said liquid crystal particles are arranged at random in a three-dimensional manner.

27. The projection type gray scale liquid crystal display apparatus of any one of claims 15-22 wherein said liquid crystal display element is applied in a reflection type display.

* * * * *